US 010423923B2

(12) United States Patent
Harsha et al.

(10) Patent No.: US 10,423,923 B2
(45) Date of Patent: Sep. 24, 2019

(54) ALLOCATING A PRODUCT INVENTORY TO AN OMNICHANNEL DISTRIBUTION SUPPLY CHAIN

(71) Applicant: INTERNATIONAL BUSINESS MACHINES CORPORATION, Armonk, NY (US)

(72) Inventors: Pavithra Harsha, White Plains, NY (US); Shivaram Subramanian, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 433 days.

(21) Appl. No.: 15/264,195

(22) Filed: Sep. 13, 2016

(65) Prior Publication Data

US 2018/0075401 A1    Mar. 15, 2018

(51) Int. Cl.
*G06Q 10/08*    (2012.01)
*G06Q 30/02*    (2012.01)
*G06Q 10/06*    (2012.01)

(52) U.S. Cl.
CPC ..... *G06Q 10/087* (2013.01); *G06Q 10/06393* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 2014/0257912 A1 | 9/2014 | Hsieh et al. | |
| 2015/0100384 A1* | 4/2015 | Ettl | G06Q 30/0206 |
| | | | 705/7.35 |
| 2015/0142516 A1 | 5/2015 | Schwans et al. | |
| 2015/0317653 A1 | 11/2015 | Ettl et al. | |
| 2016/0155137 A1 | 6/2016 | Harsha et al. | |
| 2016/0283953 A1* | 9/2016 | Ettl | G06Q 10/06315 |

(Continued)

FOREIGN PATENT DOCUMENTS

WO    2005010675 A2    2/2005

OTHER PUBLICATIONS

"Essays on Supply Chain Contracting and Retail Pricing"; Amornpetchkul, Thunyarat; University of Michigan, ProQuest Dissertations Publishing, 2014. 3619611. (Year: 2014).*

(Continued)

*Primary Examiner* — Leland Marcus
(74) *Attorney, Agent, or Firm* — Intelletek Law Group, PLLC; Gabriel Daniel, Esq.

(57) ABSTRACT

A computer implemented method and system of allocating a target commodity product onto an omnichannel distribution system is provided. Historical data related to the target commodity product is retrieved. Data mining is performed on the retrieved historical data to identify patterns therefrom. An omnichannel nominal demand prediction model is developed based on the identified patterns of the data mining for the omnichannel distribution system. A life-cycle demand is forecast. An allocation for the target commodity product based on the omnichannel nominal demand prediction model is created. A worst case scenario of allocation of the target commodity product for the omnichannel distribution system is identified. The allocation is adjusted to prevent the worst case scenario.

20 Claims, 5 Drawing Sheets

(56) References Cited

U.S. PATENT DOCUMENTS

| | | | |
|---|---|---|---|
| 2017/0206541 A1* | 7/2017 | Deshpande | G06Q 10/08345 |
| 2017/0330211 A1* | 11/2017 | Deshpande | G06Q 30/0206 |
| 2017/0330218 A1* | 11/2017 | Deshpande | G06Q 30/0635 |
| 2017/0330266 A1* | 11/2017 | Deshpande | G06Q 30/0635 |

OTHER PUBLICATIONS

"A typology of multichannel shoppers based on shopping motivations and product category" Fuambeng, Prosper Yonghachea. Capella University, ProQuest Dissertations Publishing, 2015. 10024097. (Year: 2015).*

"Dynamic Pricing in a Dual-Market Environment"; Chen, Wen; Fleischhacker, Adam J; Katehakis, Michael N. Naval Research Logistics62.7: 531-549. Wiley-Blackwell. (Oct. 2015) (Year: 2015).*

Caro, et al., "Inventory Management of a Fast-Fashion Retail Network," Operations Research, vol. 58, No. 2, Mar.-Apr. 2010, pp. 257-273.

Whaley, Keith "Dynamic Inventory Allocation," Justenough.com, Oct. 13, 2015.

Zeng, Bo "Solving Two-stage Robust Optimization Problems by a Constraint-and-Column Generation Method," Jun. 2011.

* cited by examiner $$\max_{x} \min_{c \in U} \max_{s,w} \left\{ \sum_{z \in Z} \left[ p^o s_z^{oS} + \sum_{A_z} \left[ p_z^b s_l^b + p^o s_l^{oP} \right] \right] + q \left( \sum_{j \in FC} w_j^o + \sum_{l \in A} w_l^b \right) \right.$$
$$\left. - \sum_{j \in FC, z \in Z} c_{jz}^W s_{jz}^{oSw} - \sum_{l \in A, z \in Z} c_{lz}^S s_{lz}^{oSb} - \sum_{j \in FC} C_j^T x_j - \sum_{l \in A} C_l^T x_l \right\} \quad \} \; 302$$

subject to:

$$s_l^b \leq \overline{D}_l^b (1 + \beta_l^b \epsilon_l^b) \qquad \forall l \in A$$
$$s_l^{oP} \leq \phi_z \gamma_l \overline{D}_z^o (1 + \beta_z^o \epsilon_z^o) \qquad \forall l \in A_z, z \in Z$$
$$s_z^{oS} \leq (1 - \phi_z) \overline{D}_z^o (1 + \beta_z^o \epsilon_z^o) \qquad \forall z \in Z$$
$$s_l^b + s_l^{oP} + \sum_{z \in Z} s_{lz}^{oSb} + w_l^b = I_{bl} + x_{bl} \qquad \forall l \in A$$
$$\sum_{z \in Z} s_{jz}^{oSw} + w_j^o = I_{oj} + x_{oj} \qquad \forall j \in FC$$
$$s_z^{oS} = \sum_{j \in FC} s_{jz}^{oSw} + \sum_{l \in A} s_{lz}^{oSb} \qquad \forall z \in Z$$
$$\sum_{j \in FC} x_{oj} + \sum_{l \in A} x_{bl} \leq I_{DC}$$
$$x, s, w \geq 0$$

304

Indices
- $l, z, j,$    a store, a zone, a EFC
- $o, b,$    the online channel, the brick-and-mortar channel,

Sets
- $A, Z, FC, T,$    all stores, all zones, all EFCs, all weeks,
- $A_z,$    all stores in zone $z$,
- $U,$    the demand uncertainty set defined by polyhedral constraints,

Parameters
- $p_z^b,$    brick-and-mortar price at zone $z$,
- $p^o,$    online price,
- $q,$    per-unit salvage value for inventory leftover,
- $c_{jz}^W,$    per-unit cost of fulfilling an online order in zone $z$ using inventory from EFC $j$,
- $c_{lz}^S,$    per-unit cost of fulfilling an online order in zone $z$ using inventory from store $l$,
- $C_j^T, C_l^T,$    per-unit transportation cost shipping a unit from DC to EFC $j$ or location $l$,
- $I_{bl}, I_{oj},$    initial inventory at store $l$, initial inventory at EFC $j$,
- $I_{DC},$    initial inventory at DC,
- $\phi_z,$    proportion of zone $z$ online demand for pick up in store,
- $\gamma_l,$    proportion of zone $z$ pick up in store demand originating at store $l$,
- $\overline{D}_l^b,$    the nominal demand in store location $l$,
- $\overline{D}_z^o,$    the nominal demand in the online channel at zone $z$,
- $\beta_l^b,$    width of the confidence interval of the nominal demand at store $l$,
- $\beta_z^o,$    width of the confidence interval of the nominal demand in online zone $z$,

Decision Variables
- $x_{bl}, x_{oj},$    initial inventory at store in zone $z$, initial inventory at EFC,
- $s_l^b,$    fulfilled brick-and-mortar demand from store $l$,
- $s_l^{oP},$    fulfilled online pick up in store demand from store $l$,
- $s_z^{oS},$    fulfilled online demand from zone $z$,
- $s_{jz}^{oSw},$    fulfilled online demand in zone $z$ using inventory from EFC $j$,
- $s_{lz}^{oSb},$    fulfilled online demand from zone $z$ using inventory from store $l$,
- $w_{oj},$    leftover inventory in the EFC $j$,
- $w_{bl},$    leftover inventory in brick-and-mortar store $l$.

FIG. 3

ALLOCATING A PRODUCT INVENTORY TO AN OMNICHANNEL DISTRIBUTION SUPPLY CHAIN

BACKGROUND

Technical Field

The present disclosure generally relates to systems for processing sales related data, and more particularly, to allocating inventory based on demand forecasting.

Description of the Related Art

Today, products that are introduced into a market may be managed to harmonize supply with demand via various channels. Allocation planning is used for distributing and positioning inventory. In some scenarios, an omnichannel supply chain model is for a central stock pool to control various factors, such as fulfillment, pricing, sales, ordering, and stock management. Omnichannel retailing provides a seamless customer experience across all possible touch points and locations for a product, including brick stores, catalogs, online, mobile, and social. As the product enters different stages in its life-cycle the distribution to the different channels and locations may change.

SUMMARY

According to various exemplary embodiments, a computing device, a non-transitory computer readable storage medium, and a computer implemented method are provided to allocate a target commodity product onto an omnichannel distribution system is provided. Historical data related to the target commodity product is retrieved. Data mining is performed on the retrieved historical data to identify patterns therefrom. An omnichannel nominal demand prediction model, having a model for demand uncertainty, is developed based on the identified patterns of the data mining for the omnichannel distribution system. A life-cycle demand is forecast. An allocation for the target commodity product based on the omnichannel nominal prediction model is created. A worst case scenario of allocation of the target commodity product for the omnichannel distribution system is identified. The allocation is adjusted to prevent the worst case scenario. In various embodiments, this allocation is executed periodically, at different time periods of the selling season, in order to allocate any remaining unallocated inventory. These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 illustrates a robust allocation optimization equation diagram, consistent with an exemplary embodiment.

DETAILED DESCRIPTION

Figure 1:
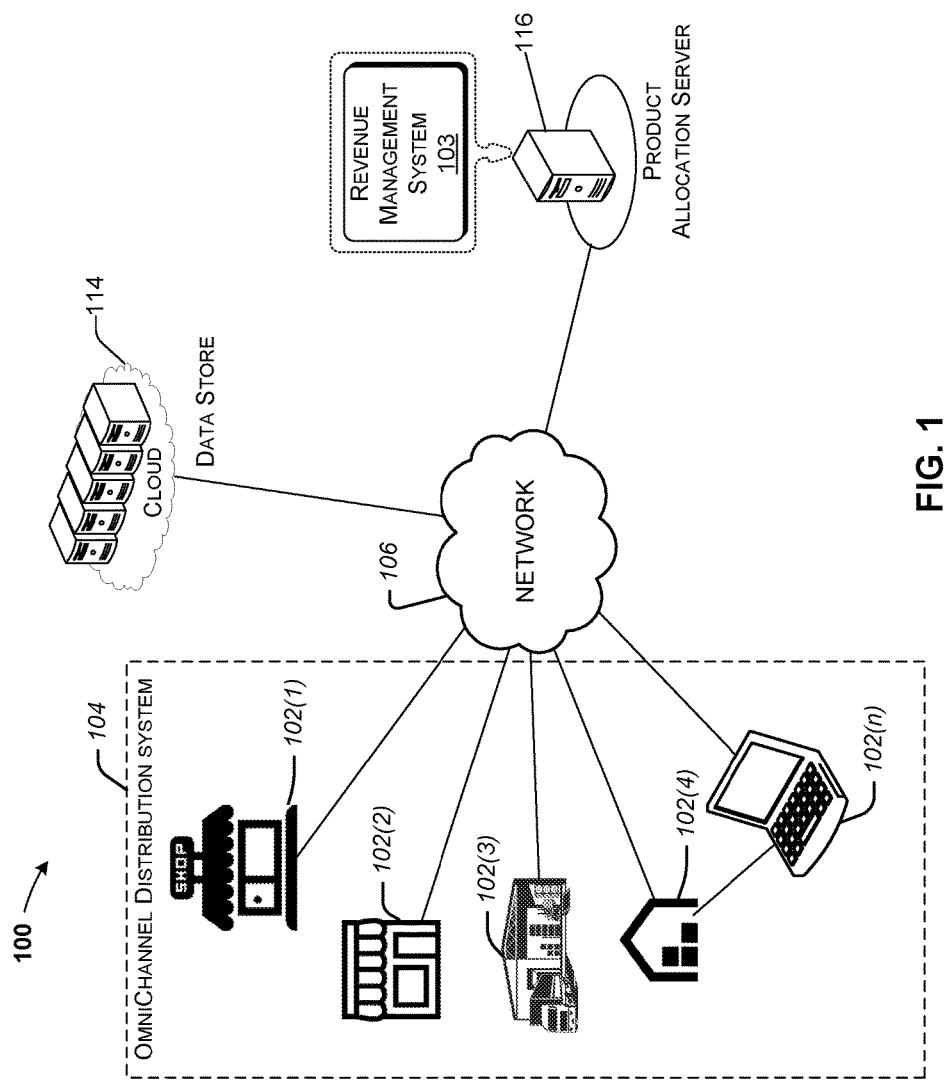
FIG. 1 illustrates an example architecture that may be used to implement an inventory allocation system.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to systems for allocating inventory based on demand forecasting. The teachings herein provide insight into future demand to drive channel allocations based on a predetermined confidence interval. As used herein, a channel may be any brick/mortar store, online store, catalogue, warehouse, clearance center, and the like. Through non-hierarchical attribution, flexible allocation solutions are provided to model trends and demand to maximize sales potential through accurate allocation of stock of a product to the various channels. By pre-allocating inventory to shared inventory across channels, it enables a retailer to accommodate a predicted change in demand over a life-cycle of a product for various channels and locations.

The embodiments disclosed herein recognize that standard processing systems for forecasting demand for sellable commodities, sometimes referred to herein as products, in the presence of lost-sales rely on historical information about the sellable commodity, and an estimate for market size or arrival rate that is fairly accurate. However, these systems may not be able to produce reliable results when the lost-sales are unobserved and the arrival rate is unknown.

Today retail chains offer a plethora of products that are to be distributed via different channels and locations. Many such products may have short life-cycle in that the introduction, growth, maturity and decline of the product is shorter than traditional products. For example, fad, fashion, and technology products may experience volatile markets with increasingly short product life-cycles due to rapid technological innovation and market competition. Current supply-demand planning systems may be ineffective in capturing short life-cycle nature of the products and the high volatility in the markets. Indeed, predictions of life-cycle demand are typically noisy in that it they are prone to a relatively high error. Simply allocating to mean demand predictions can inordinately increase ecommerce fulfillment cost and lost store sales over the selling season of a product. There are incremental costs incurred due to over-allocating at a location (e.g., excess inventory occupies space, prices are marked down, fulfilling long-distance ecommerce orders can be expensive, labor costs increase with increased shipments) as well as due to under-allocating (e.g., lost brick sales opportunities). The challenge for a retail chain may be to determine how to allocate a product over various channels such that the supply adequately meets demand at the lowest cost to the retailer and without lost sales. This allocation may also be executed periodically to allocate any remaining unallocated inventory in the warehouses or distribution centers.

To that end historical data is used for system calibration. The historical data is discussed in more detail below. The systems disclosed herein generate best fit optimization scenarios that are globally concave. Therefore, the resultant data is accurate within a predetermined confidence interval. Reference now is made in detail to the examples illustrated in the accompanying drawings and discussed below.

Example Architecture

FIG. 1 illustrates an example architecture 100 that may be used to implement an inventory allocation system. Architecture 100 includes an omnichannel distribution system 104 that may be used to distribute a commodity product. The omnichannel system 104 may include various brick and mortar that 102(1) that may be at different locations, sometimes referred to herein as zones. For example, shop 102(1) may be in New York, while shop 102(2) may be in Los Angeles. In various embodiments, the zones may be based at different levels of granularity and may overlap, such as countries, regions, states, zip codes, or may be of higher resolution, such as a particular address.

The omnichannel distribution system 104 may include one or more warehouses 102(3), where products may be received from various manufacturers. Thus, a warehouse 102(3) may be a preliminary repository for a product that can then be distributed to secondary channels, such as brick and mortar stores 102(1) and 102(2) or e-commerce warehouses 102(4), sometimes referred to e-fulfillment centers. Such e-fulfillment centers may be distributed in various zones to accommodate online (or catalogue) orders, represented herein by computing device 102(n). In the omnichannel distribution system 104, a brick and mortar store, such as store 102(1), can accommodate both walk-in customers and e-commerce customers, who may be far away from the store 102(1) using a retailer initiated ship-from-store fulfillment. Accordingly, store inventory can be used to satisfy both store demand and online demand. On the other hand, warehouses and/or e-fulfillment centers have no-walk in customers and cater predominantly to online demand.

To reduce fulfillment cost and provide better customer service, an e-fulfillment center is ideally located within a convenient shipping distance from the purchase destination of a product that has been ordered online 102(n). The omnichannel distribution system 104 shares inventory for a product to maximize revenue and reduce order fulfillment cost. Setting up new e-fulfillment centers may be costly. Accordingly, in one embodiment, omnichannel retailers can use existing brick-and-mortar store inventory to fulfil online orders when regular e-fulfillment centers are out of stock.

Each channel (102(1) to 102(n)) in the omnichannel distribution system 104 generates sales and lost sales data that may be provided to a commodity allocation server 116 and or data store 114 over a network 106. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with a data store 114 and the product allocation server 116. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The data store 114 is a data repository that is configured to store historical data from one or more products. Such historical data may include key performance indicators (KPI's) for one or more products. KPI's for a product may include, without limitation, the (i) gross margin, (ii) sell through percentage, (iii) sell through rate, (iv) percentage sold over total inventory, (v) sales dollars (e.g., revenue), etc. For each product, other relevant factors may be recorded, such as (i) promotional information (e.g., rebates, heavy advertisement by a celebrity, etc.), (ii) weather conditions at time of sale (e.g., unusual weather patterns that may affect sales, such as a heat wave driving sales of sunglasses), (iii) public events (e.g., Olympics, concerts, visit from the Pope, etc.), (iv) location and time of sale, (v) channel of sale, (vi) whether part of a basket (and contents of the basket), (vii) whether purchased in aggregate (e.g., pack of identical products), and the like. The above factors and KPI's are collectively referred to herein as transaction log data (TLOG). The TLOG for each product may be for different channels, zones, and time. The TLOG may be harvested from the omnichannel distribution system 104 or other distribution systems and stores (not shown) at predetermined intervals (e.g., weekly, monthly, etc.,), upon a trigger event (e.g., a threshold number of the product were sold), or upon request from the product allocation server 116.

For example, the product may be a next generation mobile device that has a planned introduction to the market. In this regard, TLOG from a similar mobile device (e.g., prior generation, another similarly situated mobile device, etc.,) may be retrieved from the data store 114 by the product allocation server 116 for data analysis to forecast an appropriate number of products for each channel of the omnichannel distribution system 104 for different time segments and different zones.

Over the life-cycle of a product, the demand for the product may change and different channels may better accommodate a customer. For example, the product may first arrive at a warehouse 102(3), which may be used as a preliminary allocation of the product (e.g., directly from a manufacturer of the product from various regions such as China, Malaysia, Italy, local manufacturer, etc.). The product may be distributed to different channels either directly from the manufacturer or from the warehouse 102(3). In various scenarios, the order can then be fulfilled via e-fulfillment centers 102(4) or brick and mortar stores 102(1), 102(2). To minimize purely the fulfillment cost, the fulfillment center for an order, which can be either the e-fulfillment center or the store, may be located as close as economically possible to the destination of the product, although it is often more expensive to fulfill from a store over an e-commerce fulfillment center. In some scenarios, there is a buy online pickup in store (BOPS) capability, where a product may be purchased online and picked up at a conveniently located store for immediate gratification. Thus, brick and mortar stores can be used to augment the capacity of e-fulfillment centers.

Accordingly, a retailer of a product can distribute the product via omnichannels with an emphasis on different channels at different zones, at different time periods during the life-cycle of the product, based on a predicted demand. Of course, the demand may change not only in the type of channel but also location (e.g., zone). For example, demand for a product may originally be centered in the East Coast, and then shift to the West Coast as the product matures during its life-cycle.

For example, consider that a predetermined number of units (e.g., 200) of inventory are available for allocation at the start of the season. A nominal market-size demand (e.g., brick+e-commerce) of 50 units of the product for the East Coast and 150 units for the West Coast may be predicted and allocated accordingly. Consider now the worst case realizable during this season for this allocation is the following: a market-size demand only 150 units of the product in the East Coast and 50 in the West Coast. In this regard, many store walk-in customer sales in the East Coast may be lost due to the unavailability of the product. Further, there may be West Coast to East Coast ship from store fulfillments at a high freight cost to satisfy e-commerce orders in the East Coast.

Thus, as the allocation of the product is changed, the worst case demand pattern may change, where in the worst-case demand pattern is defined as the one yielding a combined high SFS cost and lost sales in each channel. The teachings herein determine an allocation that yields the highest expected profit from its associated worst-case demand pattern. To that end, inventory of the product is positioned to avoid a worst case scenario. For example, an optimal solution may be to position a portion of the inventory of the product at one or more stores at a different location (e.g., Mid-Western) stores and e-fulfillment centers.

The product allocation server 116 includes a revenue management system 103 (RMS) that is used to optimize prices and inventory over time (e.g., the selling season for the product) using the ship-from store (SFS) for omnichannel fulfillment. The RMS 103 applies advanced analytics that predict consumer behavior related to the product at various levels of hierarchy of the market (e.g., zone, channel, time period) and optimizes the availability of the product and price to maximize revenue growth. The RMS provides the product at different channels of the omnichannel distribution system 104 at the right time for the right price and within the right pack to minimize a calculated worst case scenario for distribution. Accordingly, the availability of a product is accurately aligned with its price, channel, zone, and time period to avoid a worst case scenario based SFS fulfillment cost and lost sales in each channel. The architecture of the RMS 103 is discussed in greater detail in a later section.

Unlike prior art systems that may ignore the basket effect, where different products are purchased together, in one embodiment, the RMS 103 takes into consideration products that have traditionally been purchased together at a rate that is above a predetermined threshold, based on the historical data from the data store 114. For example, the historical data may indicate that a dress is purchased with an accessory or a phone is purchased with a case, extra battery, headphones, etc. The life-cycle of the phone is now used to predict the demand for the accessory (e.g., headphones) due to the correlation in basket sales indicated in the data store 114. Thus, to optimize the fulfillment cost, such products may be placed together such that they may be shipped together from the same warehouse from the appropriate zone. For example, ignoring the shopping basket effect, could ultimately increase the fulfillment cost in that products that are purchased together are sent from different sources to the customer/purchaser.

While the data store 114 is illustrated by way of example to be part of a common platform, it will be understood that, in one embodiment, the data store 114 may be part of separate databases. In other embodiments, the data store 114 may comprise virtual computing devices in the form of virtual machines or software containers that are hosted in a cloud, thereby providing an elastic architecture for processing and storage. For discussion purposes, the data store 114 and the product allocation server 116 are illustrated to be on separate platforms. It should be noted that the data store 114 and the product allocation server 116 can be a stand-alone computing device such as a server, or be on a single server. Thus, the functionality described herein with respect to each of the servers 114 and 116 can also be provided by one or multiple different computing devices.

Example Block Diagram

Figure 2:
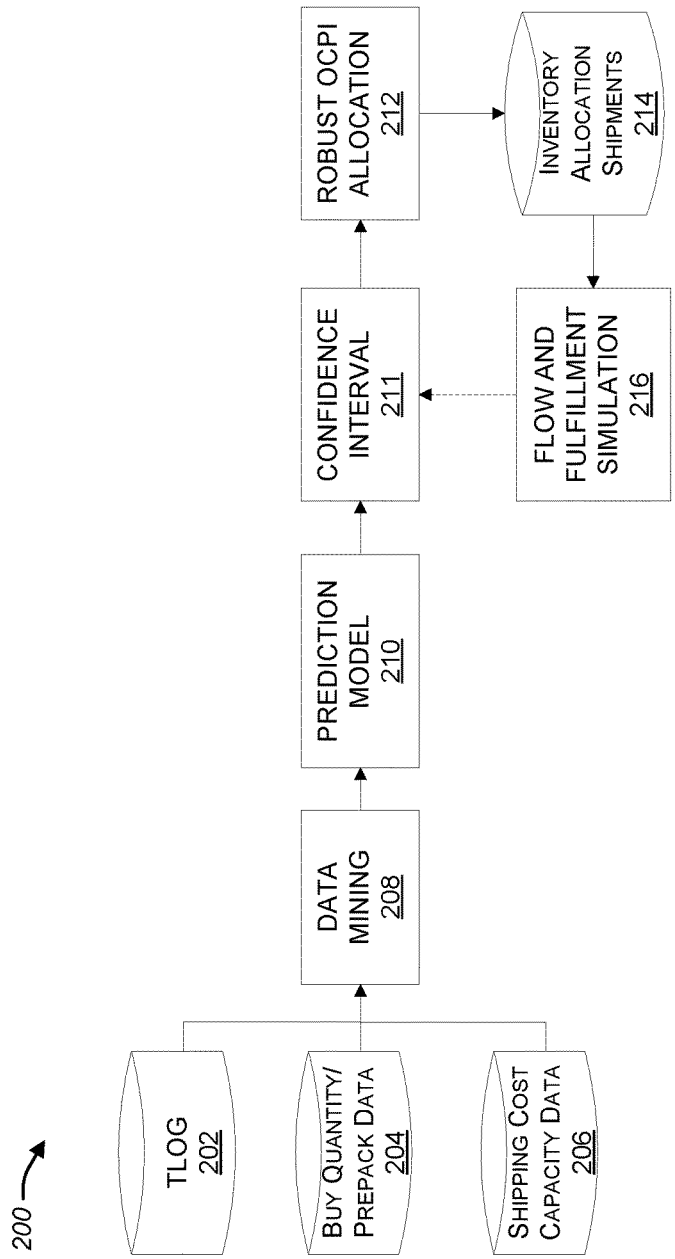
FIG. 2 illustrates a block diagram of a robust pre-allocation system for an omnichannel network, consistent with an exemplary embodiment.

FIG. 2 illustrates a block diagram of a robust pre-allocation system 200 for an omnichannel network, consistent with an exemplary embodiment. For discussion purposes, the block diagram of FIG. 2 is described with reference to the architecture 100 of FIG. 1. The RMS engine 103 receives a corpus of historical data related to a commodity product from the data store 114. For example, the data store may provide historical KPI's for a related commodity product. As discussed previously, such data may include TLOG 202 that may be geotagged to identify the region (i.e., zone) and time of sale. The TLOG also may also include other relevant information, such as the buy quantity, prepack data, and basket purchase information. For example, the information may include whether the product was purchased as a single item or in aggregate, represented by block 204. If purchased in aggregate, the information may include whether the product was part of a pack (e.g., 10 identical products prepackaged together). If data related to the commodity product indicates that the product (or similar product) was previously purchased in predetermined quantities, such information may be useful to determine a most cost effective prepackaged lot size (e.g., packs of 10), which may simplify shipping due to the appropriately prepackaged form factor.

Other information may be the shipping cost as a function of distance traveled for the product, represented by block 206. For example, in certain scenarios it may be more cost effective to have a single warehouse that supports multiple zones instead of having a warehouse in each zone, if the shipping cost is negligible or more cost effective overall (e.g., considering the cost of additional warehouse). In this regard, the capacity of a channel at a particular zone is also a salient feature. For example, even if the shipping cost from a warehouse may be cost effective, it may still make sense to distribute the commodity product to a nearby warehouse if the first warehouse cannot accommodate an expected demand volume for a product, thereby preventing a lost sales scenario.

The received data is processed by a data mining module 208 of the RMS engine 103, sometimes referred to herein as the market information processing module. This data mining module identifies patterns and/or trends in the historical data. For example, the data mining module 208 can identify a baseline demand based on average demand for a product for each channel, each zone, and each time period, and any combination thereof. The permutations may include the TLOG for a product for a particular store over different time periods, the TLOG for a product for all channels in a zone over different time periods, etc. In various embodiments, a time period may be a week, month, season (e.g., spring, summer, etc.), or any other suitable time increment that may help identify a pattern of a life-cycle demand for a product at different levels of granularity.

Block 210 develops an omnichannel nominal demand prediction model to determine a theoretical life cycle demand for the product based on the historical data of the one or more similarly situated products or prior versions of the product, collectively referred to herein as a related product, from the data store 114. The prediction model may be based on nominal demand for the related product for different combinations of channels and zones over time (e.g., life cycle demand for the related product). There is an inherent range of variation in the prediction due to the uncertainty in extrapolating from the historical data. Put differently, the prediction model 210 identifies the nominal demand value and at block 211, a confidence interval is applied to provide a window (e.g., an upper and lower limit) in the error of the prediction. In one embodiment, the initial level of confidence is set by an administrator. In another embodiment, the interval can be obtained using the predictive accuracy of the nominal demand on the historical data and extrapolated to the item under consideration. The larger the value of the confidence interval, the larger the range in possible allocations of the product over different distribution channels. For example, when there is little uncertainty in demand at a location, the product is allocated to the expected demand value. When there is more uncertainty in demand at a location, the question as to how much to allocate becomes the challenge because there is a wide range of possible scenarios to choose from.

Block 212 provides a robust omnichannel pricing and inventory (OCPI) simulation for the product. As used herein, the term robust allocation refers to increasing confidence in the omnichannel nominal demand prediction model, even when the situation may change from the predicted model. Thus, the robustness is with respect to the uncertainties in the future. For example, in robust optimization, a certain measure of robustness, referred to herein as a tolerance interval, is sought against uncertainty that can be represented as a variability in the value of the parameters of the problem itself and/or its solution. The robust allocation of the product discussed herein identifies solutions that are immune from perturbation within a predefined uncertainty (i.e., tolerance interval). By virtue of using the robust allocation of the target product, the uncertainty in the arising costs incurred due to the planned allocation is bounded. Thus, the robustness of allocation pattern to the omnichannel distribution system is increased by minimizing the combined worst case SFS fulfillment cost and lost sales in both channels. These concepts are discussed in more detail below.

For example, a best fit optimization module of the RMS engine 103 determines the worst case scenarios (among different scenarios) for product allocations for the distribution channels together. It will be understood that calculating all possible allocations and the corresponding different scenarios in order to identify the worst case scenarios may not be practical. In this regard, applicants have developed an efficient way of focusing attention to particular groups of data in order to quickly identify the robust allocation. For example, not all worst-case demand scenarios (e.g. a 3-sigma deviation in the same direction) at every location are likely to occur simultaneously. There may be a canceling out effect that is common, for example, when demands are aggregated across locations or channels. For example, brick demand may be higher than expected as well as online demand, but the total market size of (e.g., brick and online) remains close to the forecast. Such expectations are used to construct a practical uncertainty set that imposes restrictions on the total uncertainty at different levels.

In one aspect, implicit enumeration may be used such that in practice only a small fraction of the total number of feasible scenarios have to be evaluated to determine the best allocation for a given input value for the budget of uncertainty ($\tau$).

The number of possible allocation decision vectors is finite but may grow exponentially as the inventory to be allocated and the number of store locations increases. For example, if there are N units of inventory to be allocated to M locations (even with a single channel), the number of possible combinations is in the order of $O(M^N)$. If we considered in view of the omnichannel distribution system, the difficulty of the problem further increases due to cross-channel fulfillment (e.g., ship from store) possibilities using shared inventory, which can significantly impact the allocation patterns.

The worst case scenario may be identified in various ways. For example, a $\pm 3\sigma$ deviation or a predetermined percentage variation from nominal demand for each channel may be used for different time periods based on the historical data. More advanced approaches, which are discussed in the context of some calculations later, may involve specialized hardware. For example, the calculations may be performed using Java programming language that is executed on the product allocation server 116. Various optimization software packages may be used to perform the calculations. In one embodiment, IBM ILOG CPLEX Optimizer provides flexible, high-performance mathematical programming solvers for linear programming, mixed integer programming, quadratic programming, and quadratically constrained programming problems. These packages include a distributed parallel algorithm for mixed integer programming to leverage multiple computers to solve difficult problems, such as the robust OCPI allocation of a product in the omnichannel distribution system discussed herein.

At block 214, based on a desired confidence interval, the inventory for the product is allocated based on the robust OCPI allocation of the product on the various channels to avoid a worst case scenario SFS fulfillment cost and lost sales in both channels.

At block 216, the results of the allocation of the product that avoids the worst case scenario SFS fulfillment cost and lost sales in both channels are displayed on a user interface (e.g., in the form of a dashboard) that an operator can review. In one embodiment, at block 211, the operator may select a different confidence interval to rerun the robust OCPI allocation 212. By virtue of adjusting allocations and the time period of allocation of a product over the distribution channels, the worst case scenario and lost sales are prevented, thereby reducing potentially high fulfillment costs and lost revenue, while providing a customer with high satisfaction by distributing the product in a cost and time efficient way.

Omnichannel Demand Calculation

The omnichannel nominal demand for a (e.g., commodity) product for a store in a particular zone may be represented by $D_z^o$ and for zone by $D_z^b$. In some embodiments, the omnichannel demand, sometimes referred to herein as the nominal demand, may be calculated by equation 1 below:

$$D_{mt} = \theta_{kt} * R_{mt} = \theta_{kt} * ((\Sigma_{m \in M} A_m)/(\Sigma_{m' \in M} A_{m'})) \quad \text{(Eq. 1)}$$

Where:

$D_{mt}$ is the demand for a choice m at time t, m is the choice of channel (e.g., brick, online, etc.), $\theta_{kt}$ is the market size (e.g., maximum possible demand for the product at a location across all sales channels, $R_{mt}$ is the market share for a choice m at time t (e.g., fraction of total market-size of purchasing the product via channel m, $A_m$ is the attractiveness of choice m, and m' represents any choice that is not m.

As used in the context of equation 1, the term "choice" refers to all possibilities of consumer decisions related to buying and not buying a product. Such choice depends on a variety of factors, including the item attributes, competition, and inventory levels. The demand for a consumer choice is as described by equation 1 above, where it is the product of the market size and the respective market share of the choice. Here, the market share itself is the ratio of attractiveness of a choice over the sum of the attractiveness of all other choices.

Constructing a demand dataset and a market share dataset for a product may include providing a demand dataset and a market share dataset, provided in the form of TLOG by the data store 114. The demand dataset and the market share dataset may comprise a plurality of values specifying the demand and the market share. In some embodiments, the demand dataset and the market share dataset represent a demand model and a market share model.

In one embodiment, the confidence intervals may be generated for each of the estimates at different granularities of a zone (e.g., region, town, zip code, etc., down to a particular store). For example, the confidence intervals may be provided to each different channel, to all channels at a particular zone, to each different channel at a zone, etc. The confidence intervals may be computed using the historical data stored in the data store 114 using a time series from sample measurements and the corresponding error. Upon determining a confidence interval, then the demand prediction calculations are performed based on the confidence interval.

The uncertainty model for the actual omnichannel demand for a product is provided by equation 2 below:

$$D_z^m = \underbrace{\overline{D_z^m}}_{\text{Nominal}} (1 + \beta_z^m \underbrace{\epsilon_z^m}_{\text{Uncertainty}}) \quad \text{(Eq. 2)}$$
$\underbrace{\phantom{D_z^m}}_{\text{Actual}}$ Where, $D_z^m$ is the realization of the actual demand for the product in channel m and zone z,—

$\overline{D_z^m}$ is the nominal realization of the actual demand for the product in channel m and zone z, β is a confidence interval, and ∈ is a variable that represents the realization of the uncertainty variable (e.g., −1 to 1), for a variation from the nominal demand for the product.

The uncertainty set U for the omnichannel demand for the product of equation 2 is provided by the relationships below:

$$U = \begin{cases} \epsilon_z^m \text{ such that} \\ -1 \leq \epsilon_z^m \leq 1 \\ \frac{1}{|\Lambda_z|} \sum_{l \in \Lambda_z} |\epsilon_l^m| \leq \Gamma_z^m \\ \frac{1}{|\Lambda|} \sum_{l \in \Lambda} |\epsilon_l^m| \leq \Gamma^m \end{cases} \quad \text{(Eq. 3)}$$

Equation 3 above provides a budget of uncertainty constraints at a zone level, channel level, and chain level, respectively. As used herein, a chain may be a retail chain. A chain level represents aggregation across all store locations and geographies served by the seller, which may be the highest level of aggregation. For example, for a predetermined zone level demand (e.g., 5 units per week at 1500 stores), then the chain level demand is approximately 7,500 units per week. Even if the store level demand is volatile (e.g., between 0 and 10), a realistic total chain level demand variation is unlikely to be large (e.g., 0 to 15,000) but is more likely tight (e.g., 6,500 to 8,500). Accordingly, equation 3 indicates the range of values that E can take at different levels of granularity. For example, as one goes to a higher level of aggregation (e.g., across all the stores and geographies served by the seller), the E cancels out. The systemic noise cancels as one goes up the location (e.g., zone) hierarchy. Similarly, the budget of uncertainty captures the decrease in noise at higher levels of aggregation. In this regard, it is noted that the budget of uncertainty constraints can be added without losing the tractability of the demand algorithm discussed herein. While the above embodiment is described by way of example for a given set of prices, it will be understood based on the concepts discussed herein that varying prices are supported as well.

FIG. 3 illustrates a robust allocation optimization equation diagram, consistent with an exemplary embodiment. The decision variables in FIG. 3 are based on an allocation in all channels, including warehouses and brick and mortar stores. The RMS 103 of the central server 116 identifies the worst case uncertainty for future time periods. The optimized sales and ship from store flow variables are then decided.

The max-min-max variables are solved as a maximization problem 302 without uncertainty sets to provide an allocation of the product to the omnichannels discussed herein. The optimization model presented in FIG. 3, is implemented on the allocation server 116, to identify the worst case uncertainty with respect to a hypothetical product allocation.

A robust allocation optimization is then performed with a predetermined uncertainty. The uncertainty set U is based on historic data, provided by the data store 114.

Equations 304 describe a set of all feasible inventory flows for each corresponding allocation for some realization of the uncertain demand. The total profit is characterized for a given allocation, inventory flow, and demand realization. This includes the revenue gained from sales and salvage less the shipping and transportation costs. The goal of the problem is to identify the best (i.e., profit maximizing) allocation for any realization of uncertainty given the allocation, including the worst case uncertainty. The inner most maximum is over the inventory flow decision variables whose optimized values are based on the allocation and the realization of demand. The profit maximizing allocation can be equivalently treated as one that minimizes the SFS fulfillment costs including the transportation costs, if any, as well as the lost sales in all channels.

By way of the algorithm of FIG. 3, the overall profit margin is potentially improved by eliminating the worst case profit scenario. For example, by avoiding the identified worst case, the worst case SFS fulfillment cost as well as lost sales across channels is avoided. Since the relationships in the robust allocation optimization equation diagram of FIG. 3 are nonconvex, they are non-trivial to solve. Rather, in one embodiment, an iterative approach is used to converge on the solution for the robust allocation of the product over the omnichannels. In one example, a Benders Primal Cut algorithm may be used, wherein a "divide and conquer" approach is used. For example, the variables of the original problem are divided into subsets such that a first-stage master problem is solved over the first set of variables, and the values for the second set of variables are determined in a second-stage sub-problem for a given first stage solution. In this way, the potentially millions of different permutations to identify a worst case scenario are reduced to a manageable few. If the first-stage master problem cannot be solved (e.g., the confidence interval is too high), then a benders cut is generated and added to the first-stage master problem to provide additional tolerance (e.g., a smaller confidence interval). The first-stage master problem can then be run again until a converged solution is found. The sub-problem can then be solved to identify the worst case product allocation scenario, such that it can be avoided in the final distribution of the product over the omnichannels.

Example Process

Figure 4:
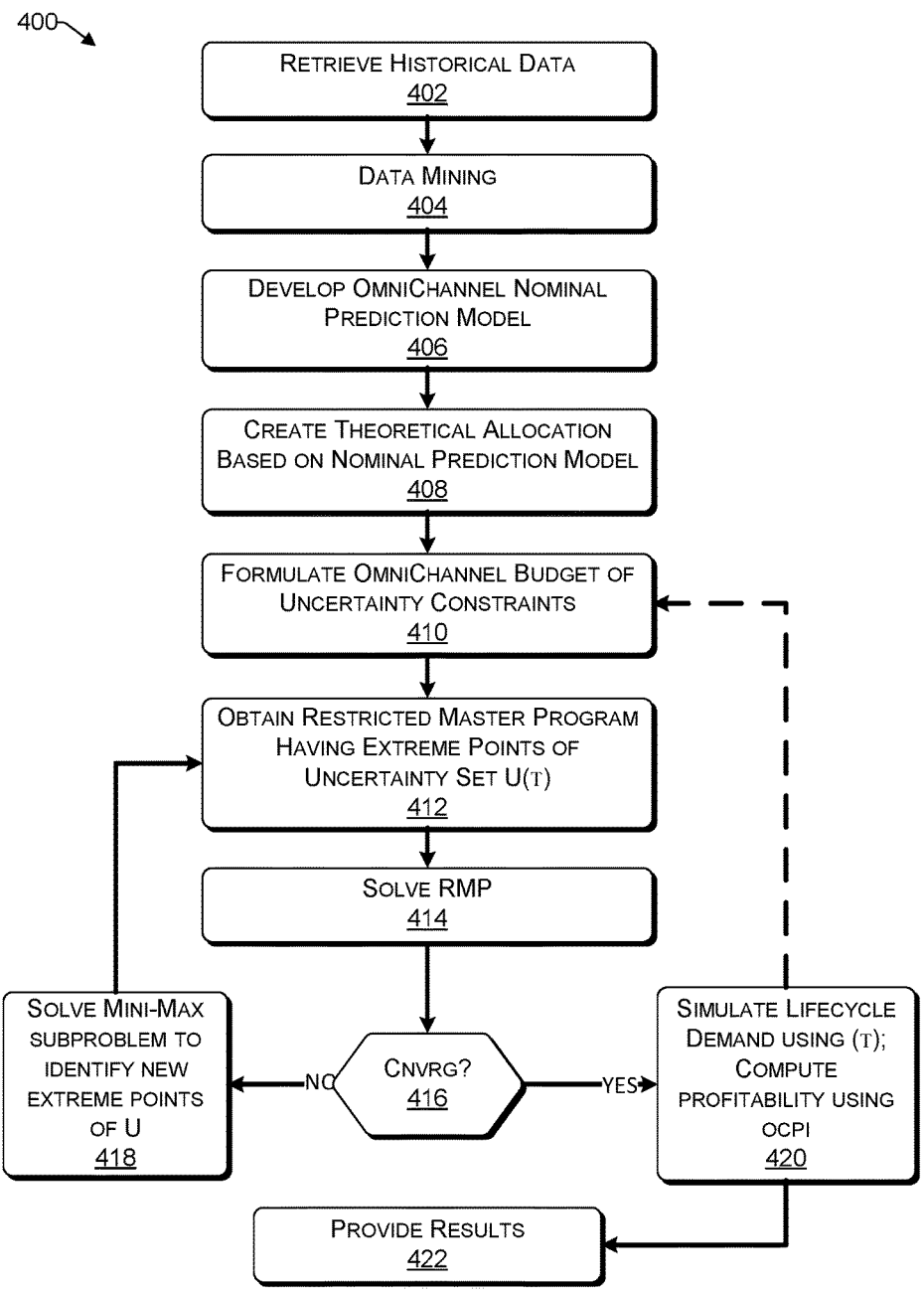
FIG. 4 presents an illustrative process for omnichannel inventory allocation, consistent with an exemplary embodiment.

With the foregoing overview of the architecture 100 of an inventory allocation system for an omnichannel network, a discussion of a block diagram block diagram 200 of a robust pre-allocation system for the omnichannel network, and a discussion of a robust allocation optimization equation diagram, it may be helpful now to consider a high-level discussion of an example process. To that end, FIG. 4 presents an illustrative process 400 for omnichannel inventory allocation that avoids a combined worst-case SFS fulfillment cost and lost sales in stores. This process may be performed by the RMS of a product allocation server 116. Processes 400 and 500 are illustrated as a collection of blocks in logical flowcharts, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1.

Referring to FIG. 4, at block 402, historical data for a similar product is retrieved by the RMS 103 of the product allocation server 116. In various embodiments, such historical data may be retrieved directly from each channel at a particular zone at a fine level of granularity (e.g., store) or in a synthesized form from the data store 114. Such historical data includes KPI's and relevant factors, as discussed previously.

At block 404, the historical data is processed via data mining by a data mining module of the RMS 103, to identify patterns and/or trends therefrom.

At block 406, an omnichannel nominal demand prediction model is developed by the RMS 103 to forecast a life-cycle demand for the product based on the processed historical data.

At block 408, a theoretical allocation is performed based on the omnichannel prediction model. The theoretical allocation may be for different levels of geographic hierarchy, referred to herein as zone hierarchy levels. The theoretical allocation may be performed for each channel, for each zone hierarchy level, and each time period, and any combination thereof, for a life-cycle of the product. Accordingly, multiple factors may be bootstrapped for the forecast.

At block 410, an upper limit of uncertainty constraints $\tau$ at different zone hierarchy levels are provided. Vector $\tau$ denotes a budget of uncertainty at various levels of geographical grouping (i.e., zones). Each element of $\tau$ represents one budget value at a particular level (e.g., zone, chain, etc.), as mentioned in the context of the discussion of equation 3 before. A relatively small value of $t_i$ generally provides a more optimistic solution, while a larger value of $\tau$ generally provides a more conservative result.

Based on the upper limit $\tau$, different uncertainty set $U(\tau)$ may be generated by the RMS 103 for the vector $\tau$, which may be provided for each zone hierarchy level. In various embodiments, the uncertainty set may be provided for each channel, time period, and/or any combination thereof, referred to herein as a hierarchy of distribution. In one embodiment, $U(\tau)$ may be represented as a system of linear inequalities that constrain individual, as well as groups, of normalized uncertainty variables E that, in one embodiment, may be in the range of $-1$ and $+1$, as discussed before in the context of equation 3.

At block 412, the RMS 103 develops a restricted master program (RMP) for the extreme points of uncertainty $U(\tau)$ to identify the worst case scenario in terms of SFS fulfillment cost and lost sales in all channels. Put differently, the nonconvex robust inventory allocation is reformulated to obtain the RMP for the uncertainty set $U(\tau)$. As discussed previously, such problem is not trivial to solve because there may be countless different possible permutations. For example, for every allocation decision vector A(i), a worst case demand pattern D(i) is identified that produces the lowest profitability P(i). This may produce countless decision vectors A(i), where I=1, 2, .... The pairs of {A(i), D(i)} are searched to identify that $A^*(\tau)$=A(i) that has the highest value of P(i). Instead of exhaustively examining all feasible permutations, a small set of feasible permutations (based on the extreme points of uncertainty) are used, which provides a smaller set of calculations to work with. This may be achieved by applying the Benders Primal Cut Algorithm.

To that end, at block 414, the RMS 103 solves the RMP based on the identified uncertainty set $U(\tau)$. As discussed previously the RMP is a nonconvex problem that may be solved iteratively. For example, the RMP and subproblem combination may be regarded as (i) an inner loop comprising blocks 412, 414, 416 and 418, which iterate between solving the RMP and subproblem until convergence is reached, and (ii) an outer loop comprising blocks 410, 412, 414, 416 and 420, which computes profitability using OCPI for an identified value of $\tau$. The input value $\tau$ is fixed within the inner loop and is not changed to achieve convergence. Rather, the inner loop iterates between the RMP and the subproblem. Each solution of the subproblem generates additional (e.g., most useful) extreme points of $U(\tau)$ to the RMP Solving the RMP provides guidance to the subproblem. This process is repeated until convergence is within a predetermined tolerance of an approximation of $U(\tau)$ (e.g., the solution quality between two successive iterations does not change by more than 1%). The value of $\tau$ may change in the outer loop. Specialized tools, such as Java programming language and IBM ILOG CPLEX Optimizer may be used for such calculations.

For example, at block 416 it is determined whether there is convergence for the solution of the RMP based on a particular value of vector $\tau$. Upon determining that convergence has not been reached (i.e., "NO" at decision block 416), the process continues with the inner loop by advancing to block 418.

At block 418, a mini-max sub-problem is solved for minimizing the possible loss for a worst case (e.g., maximum loss) scenario by identifying new extreme points of uncertainty U($\tau$). The process then returns to block 412, where the RMS 103 develops an RMP for the new extreme points of uncertainty U($\tau$) to identify the worst case scenario in terms of SFS fulfillment cost and lost sales in stores.

Returning to block 416, upon determining that convergence has been reached (i.e., "YES" at decision block 416), the process continues with the outer loop by advancing to block 420, where the life-cycle demand is simulated using the identified value of $\tau$. For different input values of $\tau$, decision vectors ($\tau$) are generated. The most suitable among the pool of these values is selected based on a variety of KPI's. For example, the decision vector that yields the best tradeoff between expected (e.g., average) profit and its standard deviation in the simulations such as a weighted average between the two can be selected for different levels of protections ($\tau$) against worst case demand realizations. For example, for a given variance threshold, the allocation that yields the best simulated profit is chosen by the revenue management system 103 of the product allocation server 116.

At block 422, the product is allocated to the omnichannel that minimizes the combined worst-case SFS fulfillment cost and lost sales in stores. In one embodiment, the results of the allocation are displayed on a user interface in the form of a dashboard that an operator can review.

Returning to block 420, in one embodiment, the process continues with block 410, where a different budget of uncertainty ($\tau$) may be used. In one embodiment, there may be three settings, such as: (i) worst case, (ii) average case, and (iii) optimistic case. By way of the feedback loop from block 420 back to block 410, the best allocation of the product may be achieved. For example, a more conservative allocation may be applied at the start of the season, followed by a more optimistic setting for a time period during the lifecycle of the product when a demand uncertainty is relatively lower.

Example Computer Platform

Figure 5:
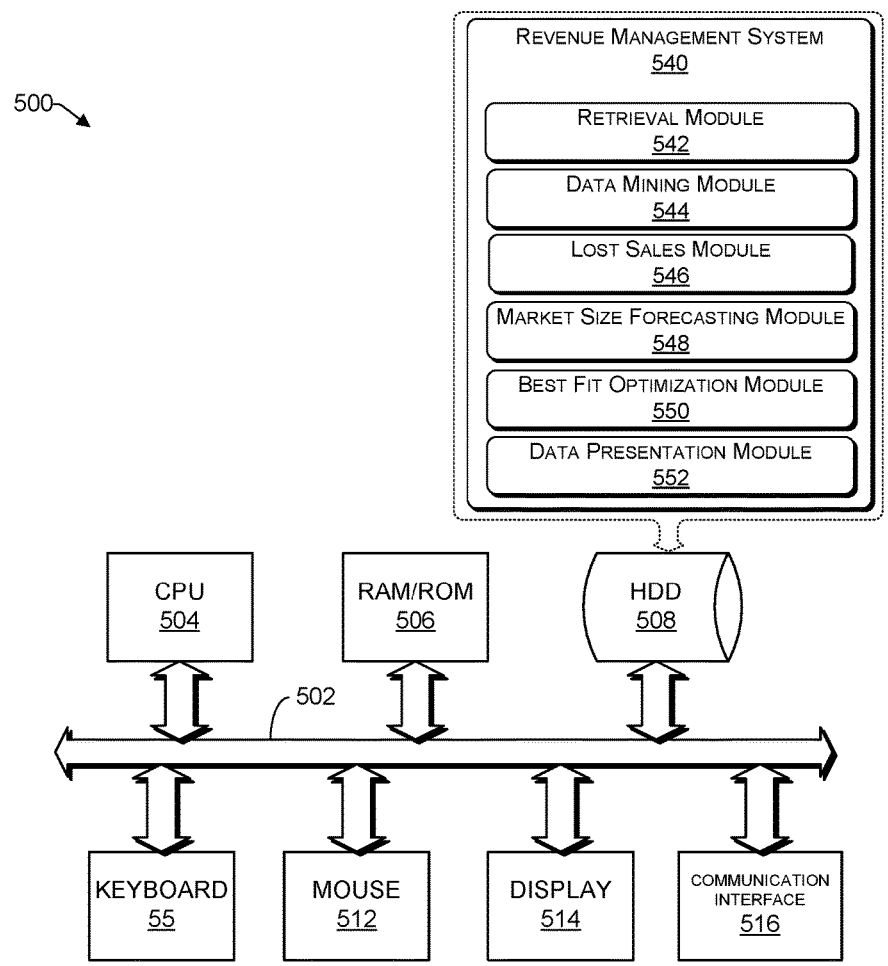
FIG. 5 provides a functional block diagram illustration of a computer hardware platform that may be used to implement the functionality of the product allocation server of FIG. 1.

As discussed above, functions relating to the inventory allocation system discussed herein can be performed with the use of one or more computing devices connected for data communication via wireless or wired communication, as shown in FIG. 1 and in accordance with the process of FIG. 4. FIG. 5 provides a functional block diagram illustration of a computer hardware platform 500 that may be used to implement the functionality of the product allocation server 116.

The computer platform 500 may include a central processing unit (CPU) 504, random access memory (RAM) and/or read only memory (ROM) 506, a hard disk drive (HDD) 508, a keyboard 510, a mouse 512, and display 514, which are connected to a system bus 502.

In one embodiment, the HDD 508, has capabilities that include storing a program that can execute various processes, such as revenue management system 540, in a manner described herein. The revenue management system 540 may have various modules configured to perform different functions to increase the robustness of the commodity product inventory allocation to minimize the combined worst-case SFS fulfillment cost and lost sales in stores.

For example, there may be a retrieval module 542 configured to retrieve historical data from a data store and/or other repositories of historical data related to a product of interest. There may be a data mining module 544 configured to identify patterns and/or trends in the historical data related to the product of interest. For example, the data mining module 544 can identify a baseline based on an average demand for a product for each channel, for each zone, and each time period, and any combination thereof.

The revenue management system 540 may also include a lost sales module 546 configure to estimate a number of products that could have been sold if the product were available at a channel, at a predetermined zone, during a predetermined period. There may also be a market size forecasting module 548 configured to provide a market size dataset as a function of a lost market rate probability. There may be a best fit optimization module 550 configured to provide a set of best fit parameters for the market size and the market share or the demand. There may be a data representation module 552 configured to present the results of the allocation of the product of interest. Such information may be displayed, for example, on a user interface in the form of a dashboard of an authorized operator.

In one example a program, such as Apache™, can be stored for operating the system as a Web server. In one embodiment, the HDD 508 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a revenue management software stored in the storage device, wherein an execution of the software by the processor configures the computing device to perform acts comprising:
   retrieving historical data related to a target commodity product;
   performing data mining on the retrieved historical data to identify patterns therefrom;
   developing an omnichannel nominal demand prediction model based on the identified patterns of the data mining for an omnichannel distribution system;
   forecasting a life-cycle demand and creating an allocation for the target commodity product based on the omnichannel nominal demand prediction model;
   identifying a worst case scenario of demand for allocation of the target commodity product for the omnichannel distribution system; and
   adjusting the allocation to prevent the allocation dependent worst case scenario.

2. The computing device of claim 1, wherein the historical data comprises transaction log (TLOG) data of a commodity product related to the target commodity product.

3. The computing device of claim 2, wherein the TLOG data comprises:
   key performance indicators (KPI's) comprising at least one of: (i) a gross margin, (ii) a sell through percentage, (iii) a sell through rate, (iv) a percentage sold over total inventory, (v) and a revenue of the commodity product; and relevant factors comprising a zone, a time, and a channel of sale of each item of the commodity product and at least one of: (i) promotional information at the zone and the time of sale, (ii) weather conditions at the zone and time of sale, and (iii) a public event at the zone and time of sale.

4. The computing device of claim 3, wherein the relevant factors further comprise at least one of: (i) information whether the sale of each item of the commodity product is part of a basket, and (ii) whether the sale of each item is part of a pack of identical commodity products.

5. The computing device of claim 1, wherein the historical data is also related to one or more products that are purchased in a same basket as the target commodity product, at a rate that is above a predetermined threshold.

6. The computing device of claim 1, wherein the omnichannel nominal demand prediction model is based on an average demand of a commodity product related to the target commodity product, for each channel, for different zones, and for different time periods over a life-cycle of the related commodity product.

7. The computing device of claim 1, wherein identifying the worst case scenario of allocation of the target commodity product comprises:
using an upper limit of uncertainty constraints τ at different zone and channel of sale hierarchy levels;
generating an uncertainty set U(τ) as a group of linear inequalities that constrain an uncertainty variable E;
developing a restricted master program (RMP) that includes extreme points of the uncertainty set U(τ);
developing a mini-max subproblem configured to calculate new extreme points of the uncertainty set U(τ);
iteratively solving the RMP and the mini-max subproblem until a convergence is reached; and
simulating a lifecycle demand based on the value of τ.

8. The computing device of claim 7, wherein developing the RMP that includes the extreme points of the uncertainty set U(t) comprises identifying a worst case scenario of a combination of ship from store (SFS) fulfilment and a lost sales in stores cost.

9. A non-transitory computer readable storage medium tangibly embodying a computer readable program code having computer readable instructions that, when executed, causes a computer device to carry out a method of allocating a target commodity product onto the omnichannel distribution system, the method comprising:
retrieving historical data related to the target commodity product;
performing data mining on the retrieved historical data to identify patterns therefrom;
developing an omnichannel nominal demand prediction model based on the identified patterns of the data mining for the omnichannel distribution system;
forecasting a life-cycle demand and creating an allocation for the target commodity product based on the omnichannel nominal demand prediction model;
identifying a worst case scenario of allocation of the target commodity product for the omnichannel distribution system; and
adjusting the allocation to prevent the worst case scenario.

10. The non-transitory computer readable storage medium of claim 9, wherein the method is performed at different times during the life-cycle of the target product.

11. The non-transitory computer readable storage medium of claim 9, wherein the historical data comprises transaction log (TLOG) data of a commodity product related to the target commodity product.

12. The non-transitory computer readable storage medium of claim 11, wherein the TLOG data comprises:
key performance indicators (KPI' s) comprising at least one of: (i) a gross margin, (ii) a sell through percentage, (iii) a sell through rate, (iv) a percentage sold over total inventory, (v) and a revenue; and
relevant factors comprising a zone, a time, and a channel of sale of each item of the commodity product and at least one of: (i) promotional information at the zone and the time of sale, (ii) weather conditions at the zone and time of sale, and (iii) a public event at the zone and time of sale.

13. The non-transitory computer readable storage medium of claim 12, wherein the relevant factors further comprise at least one of: (i) information whether the sale of each item of the commodity product is part of a basket, and (ii) whether the sale of each item is part of a pack of identical commodity products.

14. The non-transitory computer readable storage medium of claim 9, wherein the historical data is also related to one or more products that are purchased in a same basket as the target commodity product, at a rate that is above a predetermined threshold.

15. The non-transitory computer readable storage medium of claim 9, wherein identifying the worst case scenario of allocation of the target commodity product comprises:
using an upper limit of uncertainty constraints τ at different zone and channel of sale hierarchy levels;
generating an uncertainty set U(τ) as a group of linear inequalities that constrain an uncertainty variable E;
developing a restricted master program (RMP) that includes extreme points of the uncertainty set U(τ);
developing a subproblem configured to calculate new extreme points of the uncertainty set U(τ);
iteratively solving the RMP and the mini-max subproblem until a convergence is reached; and
simulating a lifecycle demand based on the value of τ.

16. The non-transitory computer readable storage medium of claim 9, wherein developing the RMP that includes the extreme points of the uncertainty set U(t) comprises identifying a worst case scenario of a combination of ship from store (SFS) fulfilment and a lost sales in stores cost.

17. A computer implemented method comprising:
retrieving historical data related to a target commodity product;
performing data mining on the retrieved historical data to identify patterns therefrom;
developing an omnichannel nominal demand prediction model based on the identified patterns of the data mining for an omnichannel distribution system;
forecasting a life-cycle demand and creating an allocation for the target commodity product based on the omnichannel nominal demand prediction model;
identifying a worst case scenario of allocation of the target commodity product for the omnichannel distribution system; and
adjusting the allocation to prevent the worst case scenario.

18. The computer implemented method of claim 17, wherein the historical data comprises transaction log (TLOG) data of a commodity product related to the target commodity product.

19. The computer implemented method of claim 18, wherein the TLOG data comprises:
key performance indicators (KPI' s) comprising at least one of: (i) a gross margin, (ii) a sell through percentage, (iii) a sell through rate, (iv) a percentage sold over total inventory, (v) and a revenue of the commodity product; and relevant factors comprising a zone, a time, and a channel of sale of each item of the commodity product and at least one of: (i) promotional information at the zone and the time of sale, (ii) weather conditions at the zone and time of sale, and (iii) a public event at the zone and time of sale.

20. The computer implemented method of claim 17, wherein identifying the worst case scenario of allocation of the target commodity product comprises:

using an upper limit of uncertainty constraints $\tau$ at different zone hierarchy levels;

generating an uncertainty set $U(\tau)$ as a group of linear inequalities that constrain an uncertainty variable E;

developing a restricted master program (RMP) for extreme points of the uncertainty set $U(\tau)$;

developing a mini-max subproblem configured to calculate new extreme points of the uncertainty set $U(\tau)$;

iteratively solving the RMP and the mini-max subproblem until a convergence is reached; and simulating a lifecycle demand based on the value of $\tau$.

* * * * *